Sept. 4, 1928.
J. WASHINGTON
HAND STARTER FOR AUTOMOBILES
Filed July 29, 1927
1,683,111
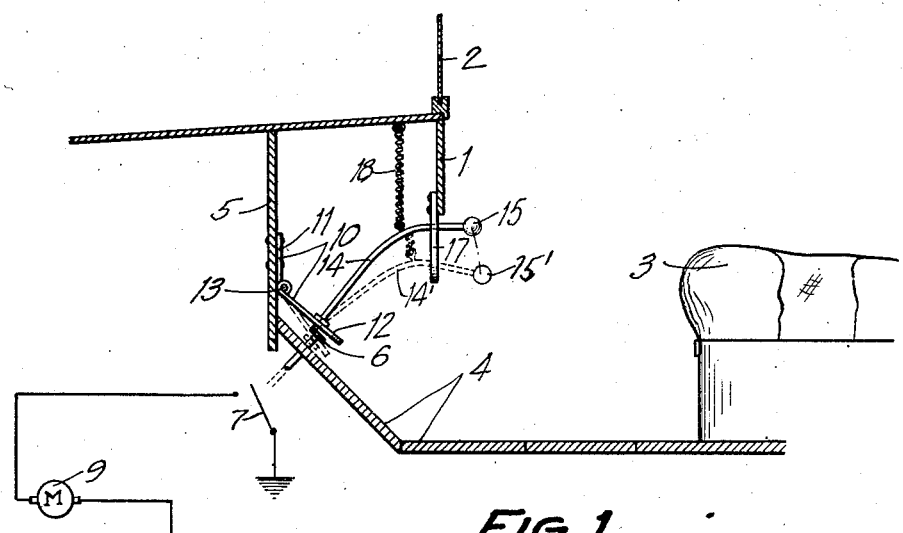
FIG.1
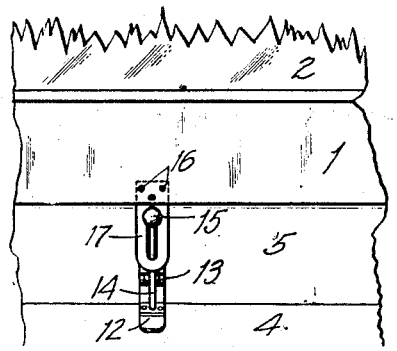
FIG.2
FIG.3
INVENTOR
Juluies Washington
By 
ATTORNEY Patented Sept. 4, 1928.

1,683,111

UNITED STATES PATENT OFFICE.

JULUIES WASHINGTON, OF RAVENA, NEW YORK.

HAND STARTER FOR AUTOMOBILES.

Application filed July 29, 1927. Serial No. 209,377.

My invention relates to automobiles and particularly to an auxiliary means for actuating the pedal switch ordinarily used in starting the motor.

All automobiles of the present day are equipped with electric starting motors which are put into action by depressing, with the foot, a button or pedal switch which extends up through the floor boards of the vehicle.

It frequently happens in operating an automobile that the motor is stalled while ascending a steep grade. With the present arrangement of the starting switch it is necessary for the operator, in such case, to first throw out the clutch with one foot and hold the car from backing down the hill by depressing the brake with the other foot. It is then necessary to apply the hand brake so that the car will not move when the foot is removed from the brake pedal and then depress the starting switch with the foot which was upon the brake pedal.

The objects of my invention therefore are to eliminate this difficulty by providing a means whereby the starter switch may be depressed not only by the foot, in ordinary circumstances, but by the hand under such circumstances as are recited above. Another object of my invention is to provide a device of extremely simple character which is adapted for attachment to any car.

With these objects in view my invention includes the novel elements, combinations and arrangements of elements described below and illustrated in the accompanying drawings in which—

Fig. 1 is a fragmentary sectional view of so much of an automobile as is necessary to illustrate the attachment of my device;

Fig. 2 is a typical diagram illustrating the ordinary electric elements and wiring used in connection with the starting motor; and Fig. 3 is a view of my hand starter as seen from the driver's seat.

Referring to the drawings, 1 represents the instrument board on the automobile, 2 is the windshield, 3 the seat, 4 the floor boards and, 5 is the partition at the rear of the engine compartment. In most cars the starting button, 6, is located quite close to the partition, 5, where it may be reached by the right foot of the operator and depressed. The depression of the button, 6, closes the switch, 7, and completes the electrical circuit from the storage battery, 8, through the starting motor, 9.

Attached to the partition, 5, and preferably in the same longitudinal, vertical plane as the starting button, 6, is the hinged element, 10, comprising the member, 11, which is bolted or otherwise secured to the partition, and the member, 12, hinged to the member, 11, at 13. The member, 12, is of sufficient length to extend over the button, 6, and preferably somewhat beyond, as shown. Rigidly attached at some convenient position on the member, 12, is the hand starting lever, 14, which extends upwardly and backwardly towards the driver's seat and is provided at its extremity with a grip, 15, conveniently located for the driver. Attached to the rear of the instrument board, 1, by means of bolts or screws, 16, is the slotted guide member, 17, through which passes the lever, 14. The sides and top portions of the slot in the member, 17, may be lined with rubber or other material to prevent rattling. In order to prevent the hinged member, 12, from lying in contact with the button, 6, the tension spring 18, is provided. One end of this spring is secured to the lever, 14, by any suitable means and the other end is secured beneath the cowl, or at any other convenient place, so that the lever, 14, will only be pulled upwardly. The upward movement of the lever will be limited by the top of the slot in the member, 17, and the member, 12, will thus be held away from the button, 6.

It will be apparent from the above description that the starter may be operated either by pressing the extremity of the member, 12, with the foot or by pulling the handle, 15, downwardly to the position, 15', as shown in Fig. 1. The lever, 14, is of such length that very little effort is required to press the handle, 15, and it will also be noted that the movement of the handle is directly downward. This feature of my device makes it much easier to operate than an arrangement whereby it would be necessary to press the lever directly in the direction in which the button, 6, moves. There are no concealed moving parts and no lubrication whatever is necessary.

While I have described my invention in its preferred embodiment it is to be understood that the words which I have used are words of description rather than of limitation and that changes within the purview of the appended claims may be made without departing from the true scope and spirit of my invention in its broadest aspects.

What I claim is—

1. In a motor vehicle having an instrument board, the combination with an electric switch for starting the motor and adapted to be actuated by the foot of the operator, of a hinged element connected to said vehicle and having a movable member extending over said switch, a lever connected to said hinged element and extending upwardly and backwardly below the instrument board to a point within easy reach of the vehicle operator, and a slotted element attached to said instrument board and forming a guide adapted to permit the lever to be moved in a vertical plane about the axis of the hinged element.

2. In a motor vehicle having a partition at the rear of the motor compartment, the combination with an electric switch for starting the motor and adapted to be actuated by the foot of the operator, of a hinged element having one member connected to said partition and the other, movable member extending over said switch, a lever connected to said movable member and extending upwardly and backwardly to a point within easy reach of the operator, and a tension spring normally holding the lever in elevated position and the movable member out of contact with said switch.

3. In a motor vehicle, having an instrument board, the combination with an electric switch for starting the motor and adapted to be closed by the foot of the operator, of a hinged member disposed over and extending beyond said switch to form a foot pedal for actuating the same, a lever attached to said pedal and extending upwardly and backwardly to a point within easy reach of the operator for actuating said pedal by hand, a guide member for said lever secured to the instrument board and adapted to permit said lever to move in a vertical plane about the axis of the hinged member, and spring means for normally holding the hand lever in elevated position.

JULUIES WASHINGTON.